United States Patent
Huscher et al.

(10) Patent No.: US 11,015,489 B1
(45) Date of Patent: May 25, 2021

(54) TURBINE WASTE HEAT RECOVERY EXPANDER WITH PASSIVE METHOD FOR SYSTEM FLOW CONTROL

(71) Applicant: BorgWarner Inc., Auburn Hills, MI (US)

(72) Inventors: Frederick Michael Huscher, Hendersonville, NC (US); Paul Anschel, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/825,765

(22) Filed: Mar. 20, 2020

(51) Int. Cl.
| F02B 41/10 | (2006.01) |
| F01K 23/06 | (2006.01) |
| F01K 25/08 | (2006.01) |
| F01K 23/10 | (2006.01) |
| F02G 5/02 | (2006.01) |
| F01D 9/04 | (2006.01) |
| F01N 5/02 | (2006.01) |

(52) U.S. Cl.
CPC ............ F01K 23/065 (2013.01); F01K 23/10 (2013.01); F01K 25/08 (2013.01); *F01D 9/04* (2013.01); *F01N 5/02* (2013.01); *F02G 5/02* (2013.01); *F02G 2260/00* (2013.01); *F05D 2220/60* (2013.01); *F05D 2250/51* (2013.01)

(58) Field of Classification Search
CPC .. F01D 17/14–18; F01D 9/047; F01K 23/065; F01K 23/10; F01K 25/08
See application file for complete search history.

(56) References Cited

U.S. PATENT DOCUMENTS

| 3,814,537 | A | 6/1974 | Stoltman |
| 4,768,344 | A | 9/1988 | Stojicic |
| 5,205,125 | A | 4/1993 | Potter |
| 5,311,742 | A * | 5/1994 | Izumi .................. F23R 3/34 60/742 |
| 6,810,666 | B2 | 11/2004 | Lutz |
| 6,824,347 | B2 | 11/2004 | Maloney |
| 8,590,307 | B2 | 11/2013 | Kopecek et al. |
| 8,813,498 | B2 * | 8/2014 | Kopecek ............... F01K 13/02 60/653 |
| 9,206,691 | B2 | 12/2015 | Hasemann |
| 2010/0011766 | A1 | 1/2010 | Grundl |
| 2013/0205783 | A1 * | 8/2013 | Krinn ................... F01K 21/00 60/660 |
| 2019/0264606 | A1 * | 8/2019 | Huscher .............. F01D 17/105 |

\* cited by examiner

*Primary Examiner* — Shafiq Mian
(74) *Attorney, Agent, or Firm* — von Briesen & Roper, s.c.

(57) ABSTRACT

A waste heat recovery system for recovering rejected heat of an internal combustion engine includes a turbine expander. The turbine expander outputs power based on a working fluid and includes a turbine blade that is rotatable by the working fluid, a shaft that is coupled to and rotatable by the turbine blade and extends along a longitudinal axis, and a nozzle assembly for directing the working fluid to the turbine blade for rotating the turbine blade. The nozzle assembly includes a nozzle housing disposed about the shaft and adjacent the turbine blade, and a nozzle for accelerating the working fluid. The nozzle component defines a nozzle throat having a geometrical configuration. The waste heat recovery system further includes a passive control coupled to the nozzle component for directing the working fluid.

20 Claims, 10 Drawing Sheets

TURBINE WASTE HEAT RECOVERY EXPANDER WITH PASSIVE METHOD FOR SYSTEM FLOW CONTROL

TECHNICAL FIELD

The present disclosure relates generally to a waste heat recovery system for recovering waste heat of an internal combustion engine.

BACKGROUND

Internal combustion engines (ICEs) convert chemical energy to shaft work during operation and reject heat as a byproduct. Waste heat recovery systems convert this discarded heat into useful work that may be used to reduce fuel consumption of a motor vehicle.

Organic Rankine cycle (ORC) waste heat recovery systems may include a pump, evaporator, expander, and condenser. The expander outputs power extracted from a pressurized working fluid. A common expander type includes a turbine blade that is rotatable by the working fluid, a shaft coupled to and rotatable by the turbine blade and extending along a longitudinal axis, and a way to direct the working fluid to the turbine blade for rotating the turbine blade.

An ORC waste heat recovery system utilizes a Rankine process that uses an organic fluid as a working fluid in a closed loop thermodynamic cycle. In an ORC, a liquid phase working fluid is pumped to a higher pressure, the working fluid is evaporated to a vapor phase, the high pressure vapor is expanded to extract mechanical or electrical work, and then the working fluid is condensed back to a liquid to return to the pump. An automotive ORC cycle uses heat from the ICE that is normally rejected from the engine to the environment.

US Patent Pub. No. 2019/0264606, titled "Waste Heat Recovery System and Turbine Expander for the Same," and assigned to BorgWarner Inc., discloses an ORC waste heat recovery systems where the turbine nozzles are actively actuated by the controller based on sensor feedback. While this type of approach has performance advantages, the increased number of components with moving parts increases system cost and the added complexity may contribute to reliability issues.

As such, there remains a need to provide an improved waste heat recovery system.

SUMMARY

In one described embodiment of the disclosure, a turbine expander for outputting power based on a working fluid is described. The turbine may include a turbine blade rotatable by the working fluid, and a shaft coupled to and rotatable by the turbine blade that extends along a longitudinal axis. Further included is a nozzle assembly for directing the working fluid to the turbine blade and for rotating the turbine blade. The nozzle assembly includes a nozzle housing disposed about the shaft and adjacent the turbine blade, and a nozzle component for accelerating the working fluid. The nozzle component defines a nozzle throat having a geometrical configuration. A passive control is coupled to the nozzle component and directs the working fluid. The passive control may have a channel in fluid connection with the nozzle, and the channel includes a seal that may be in apposition across an interior width of the channel. The seal is configured to move from a closed position to an open position.

In another described embodiment of the disclosure, an organic Rankine cycle waste heat recovery system for recovering waste heat from an internal combustion engine is provided. The waste heat recovery system includes an evaporator for transferring heat discarded by an internal combustion engine to a working fluid and a turbine expander for outputting power based on the working fluid. The turbine may include a turbine blade rotatable by the working fluid, and a shaft coupled to and rotatable by the turbine blade that extends along a longitudinal axis. Further included is a nozzle assembly for directing the working fluid to the turbine blade and for rotating the turbine blade. The nozzle assembly includes a nozzle housing disposed about the shaft and adjacent the turbine blade, and a nozzle component for accelerating the working fluid. The nozzle component defines a nozzle throat having a geometrical configuration. A passive control is coupled to the nozzle component and directs the working fluid. The passive control may have a channel in fluid connection with the nozzle, and the channel includes a seal that may be in apposition across an interior width of the channel. The seal is configured to move from a closed position to an open position. The system may further have a condenser in fluid communication with the turbine expander to condense the working fluid from a vapor state to a liquid state, and a pump to circulate a working fluid from the condenser to the evaporator.

In yet another described embodiment of the disclosure, a method of recovering waste heat from an internal combustion engine is provided. The method includes providing a turbine expander for outputting power based on a working fluid. The turbine expander may include a turbine blade rotatable by the working fluid, and a shaft coupled to and rotatable by the turbine blade that extends along a longitudinal axis. Further included is a nozzle assembly for directing the working fluid to the turbine blade and for rotating the turbine blade. The nozzle assembly includes a nozzle housing disposed about the shaft and adjacent the turbine blade, and a nozzle component for accelerating the working fluid. The nozzle component defines a nozzle throat having a geometrical configuration. A passive control is coupled to the nozzle component and directs the working fluid, the passive control may have a channel in fluid connection with the nozzle, and the channel includes a seal that may be in apposition across an interior width of the channel. The seal is configured to move from a closed position to an open position. The method further includes directing a first portion of the working fluid to a first passive control of the one or more passive controls, receiving the working fluid at a first nozzle component of the one or more nozzle components.

BRIEF DESCRIPTION OF THE DRAWINGS

One or more embodiments of the disclosure will hereinafter be described in conjunction with the appended drawings, wherein like designations denote like elements, and wherein.

DETAILED DESCRIPTION OF ILLUSTRATED EMBODIMENTS

Figure 1:
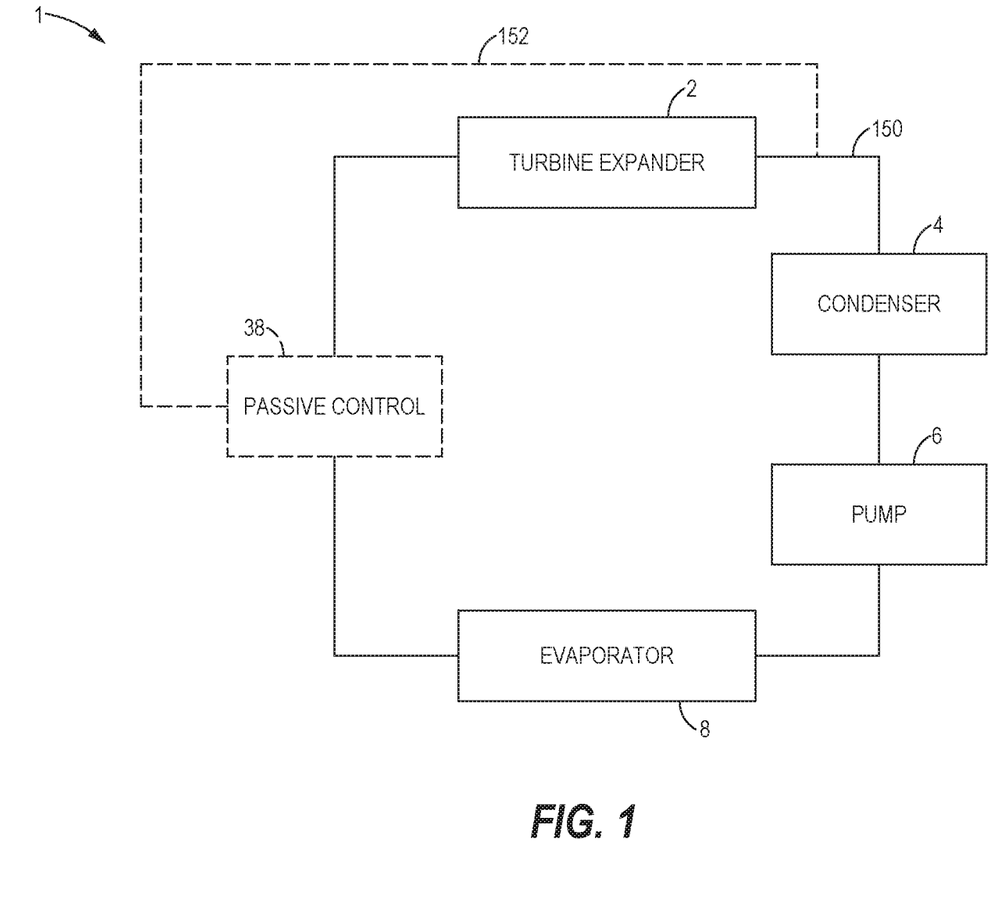
FIG. 1 is a schematic illustration of a waste heat recovery system including a turbine expander and a passive control.

With reference to the Figures, wherein like numerals indicate like parts throughout the several views, an organic Rankine cycle (ORC) waste heat recovery system 1 for recovering waste heat of an internal combustion engine (ICE) is schematically shown in FIG. 1. The waste heat recovery system 1 includes a turbine expander 2 for outputting power based on a working fluid (not shown), a condenser 4 for condensing the working fluid from a vapor state (not shown) to a liquid state (not shown) after the working fluid passes through the turbine expander 2, a pump 6 to adjust the working fluid flow rate through the waste heat recovery system 1, an evaporator 8 for transferring heat rejected by the ICE to the working fluid, and a passive control 38 for directing the working fluid to the turbine expander 2.

Figure 2:
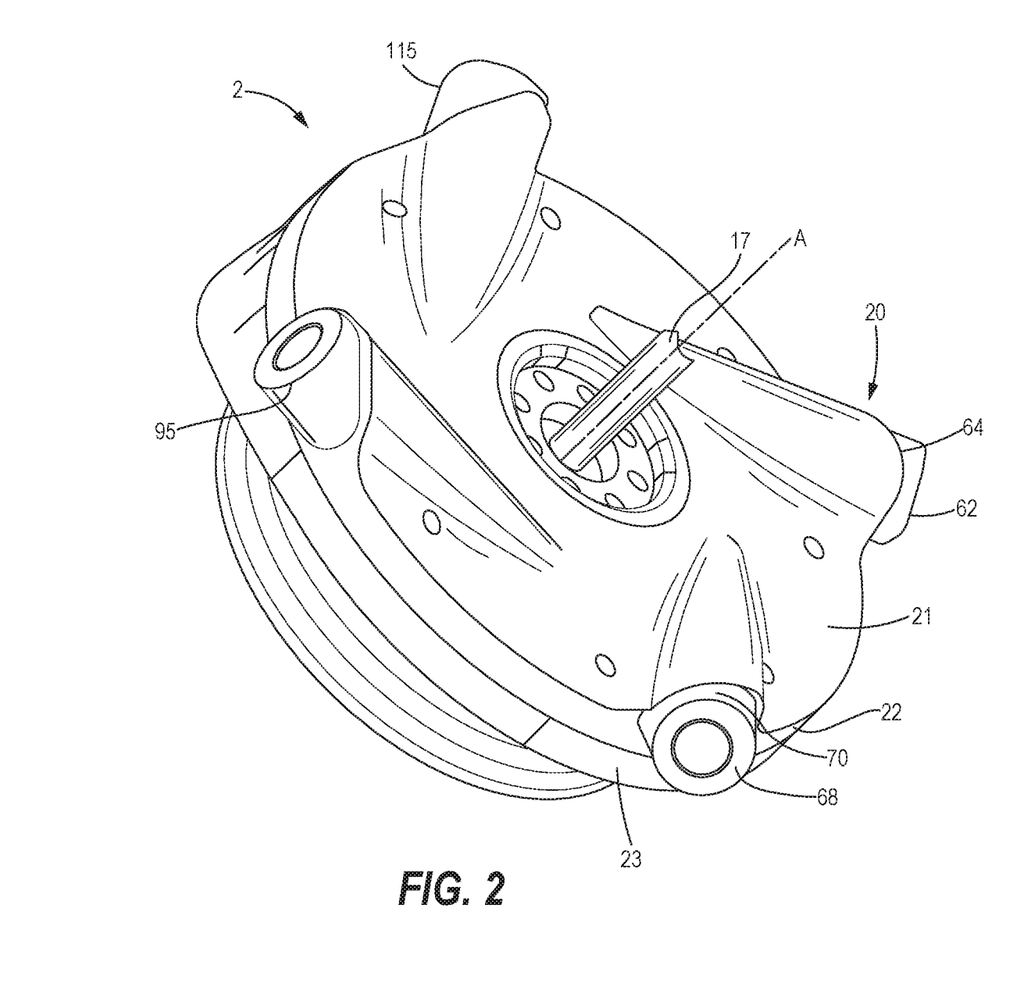
FIG. 2 is a perspective view of a turbine expander, according to one exemplary embodiment of the present disclosure.

Referring to FIGS. 2-6 with continued reference to FIG. 1, the turbine expander 2 includes a turbine blade 16 rotatable by the working fluid. As best shown in FIG. 2, the turbine expander 2 also includes a shaft 17 coupled to and rotatable by the turbine blade 16. The shaft 17 extends along a longitudinal axis A. The working fluid causes rotation of the turbine blade 16 about the longitudinal axis A of the shaft 17.

Figure 4:
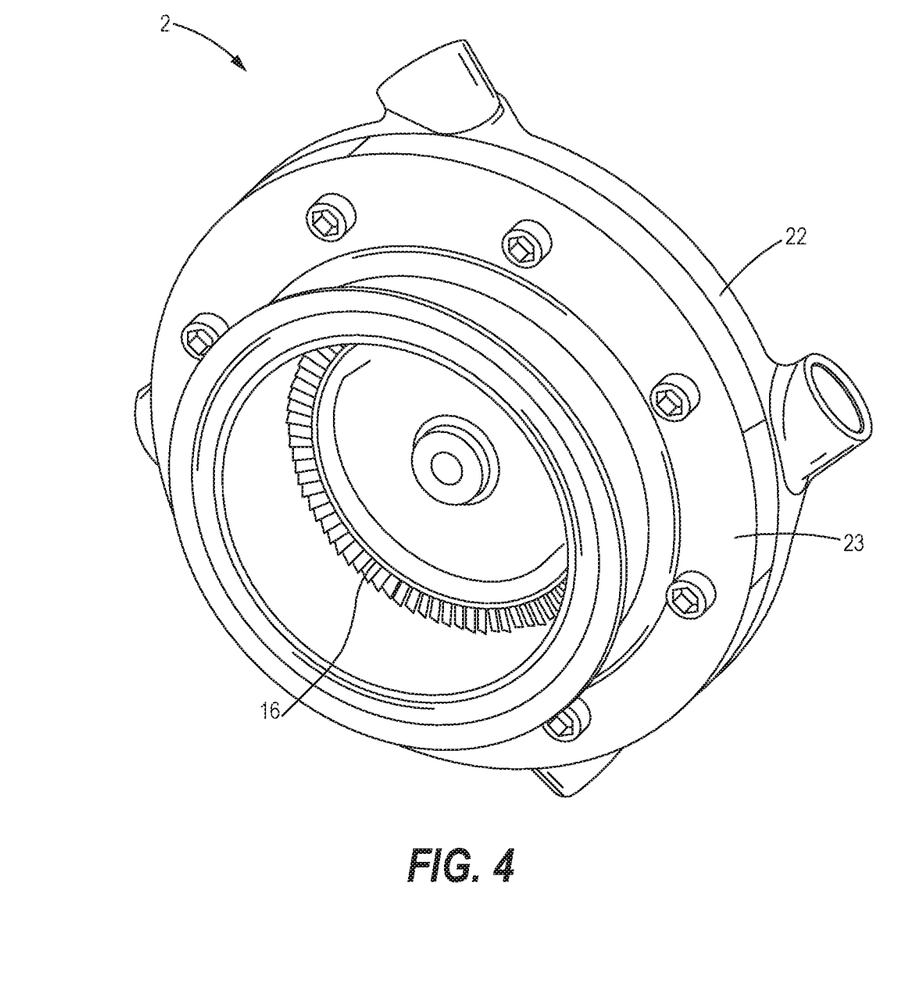
FIG. 4 is a perspective view of the exemplary turbine expander of FIG. 1 including a bottom of a nozzle housing of the turbine expander.

With continued reference to FIG. 2, the turbine expander 2 further includes a nozzle assembly 20 for directing the working fluid to the turbine blade 16. The nozzle assembly 20 includes a top nozzle housing 21 disposed about the shaft 17 and adjacent to the turbine blade 16. Typically, the nozzle housing 21 has an annular configuration. However, the nozzle housing 21 may have any configuration suitable for directing the working fluid to the turbine blade 16. The nozzle housing 21 may have a top 22 facing the shaft 17, as best shown in in FIG. 2, and a bottom 23 facing opposite the top 22, as best shown in FIG. 4.

Figure 3:
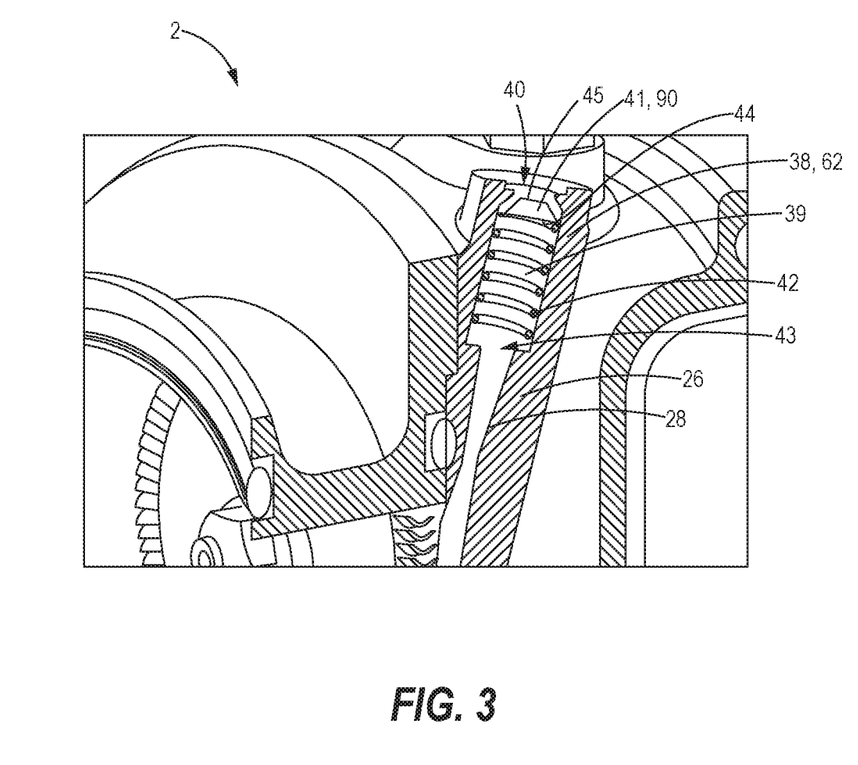
FIG. 3 is a sectional view of the exemplary nozzle assembly of FIG. 1.
Figure 5:
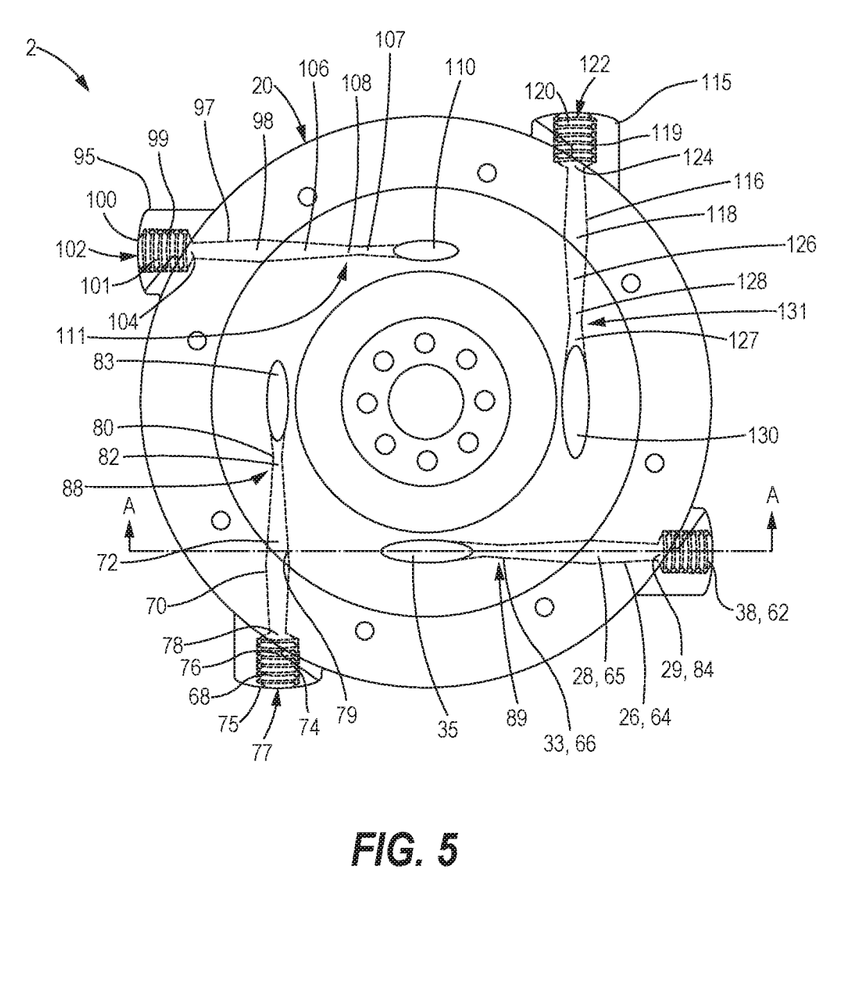
FIG. 5 is a top view of the exemplary turbine expander of FIG. 1, with the turbine expander including a top of the nozzle housing, a first passive control coupled to a first nozzle component shown in phantom, a second passive control coupled to a second nozzle component shown in phantom, a third passive control coupled to a third nozzle component shown in phantom, and a fourth passive control coupled to a fourth nozzle component shown in phantom.

With reference to FIGS. 3 and 5, the nozzle assembly 20 also includes a nozzle component 26 coupled to the nozzle housing 21 for accelerating the working fluid. The nozzle component 26 defines a nozzle 28. In one embodiment, the nozzle component 26 is integral (i.e., one-piece) with the nozzle housing 21, as shown in FIG. 3. In another embodiment, as described in further detail below, the nozzle component 26 may be separate from (i.e., not integral with) the nozzle housing 21.

The nozzle 28 has a geometrical configuration. The geometrical configuration may be a converging-type configuration, a diverging-type configuration, or a de Laval (converging-diverging-type) configuration. Typically, the geometrical configuration is a de Laval configuration as shown in FIGS. 3 and 5.

Figure 6:
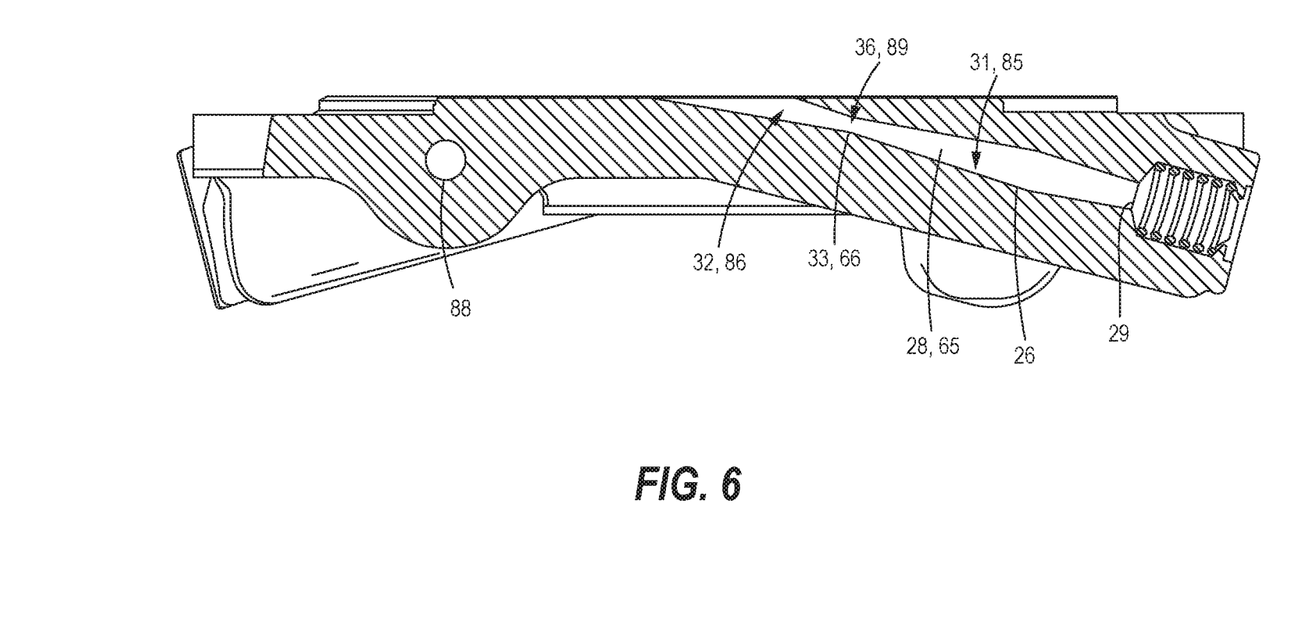
FIG. 6 is a cross-sectional view of the first and fourth nozzle components taken along line A-A of FIG. 5.

As best shown in FIG. 6, when the geometrical configuration of the nozzle 28 is a de Laval configuration, the nozzle 28 may have a working fluid inlet 29, a converging section 31, a diverging section 32, a throat section 33 separating the converging section 31 from the diverging section 32, and a working fluid outlet 35. When present, the converging section 31 extends from the working fluid inlet 29 to the throat section 33. When the converging section 31 is present, the cross-sectional area of the nozzle 28 gradually decreases from the working fluid inlet 29 to the throat section 33. When the diverging section 32 is present, the cross-sectional area of the nozzle 28 gradually increases from the throat section 33 to the working fluid outlet 35. When present, the throat section 33 is where the cross-sectional area of the nozzle 28 is at a minimum. In the context of this disclosure, the minimum cross-sectional area of the nozzle 28 is referred to as the throat cross-sectional area 36.

The working fluid passes through the converging section 31 of the nozzle 28 to the throat section 33. If the working fluid has a suitable pressure, the working fluid velocity is choked at the throat section 33. Whether the working fluid is of a suitable pressure for the working fluid velocity to be choked at the throat section 33 is based on the throat cross-sectional area 36. The working fluid is the expanded in the diverging section 32 such that the working fluid velocity is increased. In this manner, the nozzle 28 accelerates the working fluid.

As best illustrated in FIG. 3, the working fluid is directed to the working fluid inlet 29 of the nozzle 28 after first passing through a passive control 38. The passive control 38 is coupled to the nozzle component 26 and includes a channel 39 in fluid communication with the nozzle 28. In one embodiment, the passive control 38 is integral (i.e., one-piece) and defined by the nozzle component 26, as shown in FIG. 3. In another embodiment, as described in further detail below, the passive control 38 may be separate from (i.e., not integral with) the nozzle component 26.

In one exemplary embodiment, the passive control 38 may further include a passive control inlet 40, a seal 41 in apposition across an interior width of the channel 39, a biasing member 42, and a passive control outlet 43. In an exemplary embodiment, the seal 41 may prevent the working fluid from entering into the channel 39 until a pressure of the working fluid reaches a great enough force to come in contact with and move the seal 41 from a closed position to an open position. The closed position being when the seal 41 is in apposition across an interior width of the channel 39, preventing the working fluid from entering the channel 39 through the passive control inlet 40, and the open position being when the seal 41 is out of apposition. In another exemplary embodiment, the biasing member 42 supplies the force to the bottom 44 of the seal 41 to keep the seal 41 in the closed position, and the seal 41 moves to the open position when a force from the working fluid is applied to the top 45 of the seal 41 that is great enough to overcome the force being applied by the biasing member 42. In a further exemplary embodiment, the biasing member 42 is a spring, but in other embodiments, the seal 41 may include the components found in a valve which passively reacts to changes in working fluid temperature, working fluid pressure, or other inputs as the biasing member.

Figure 7:
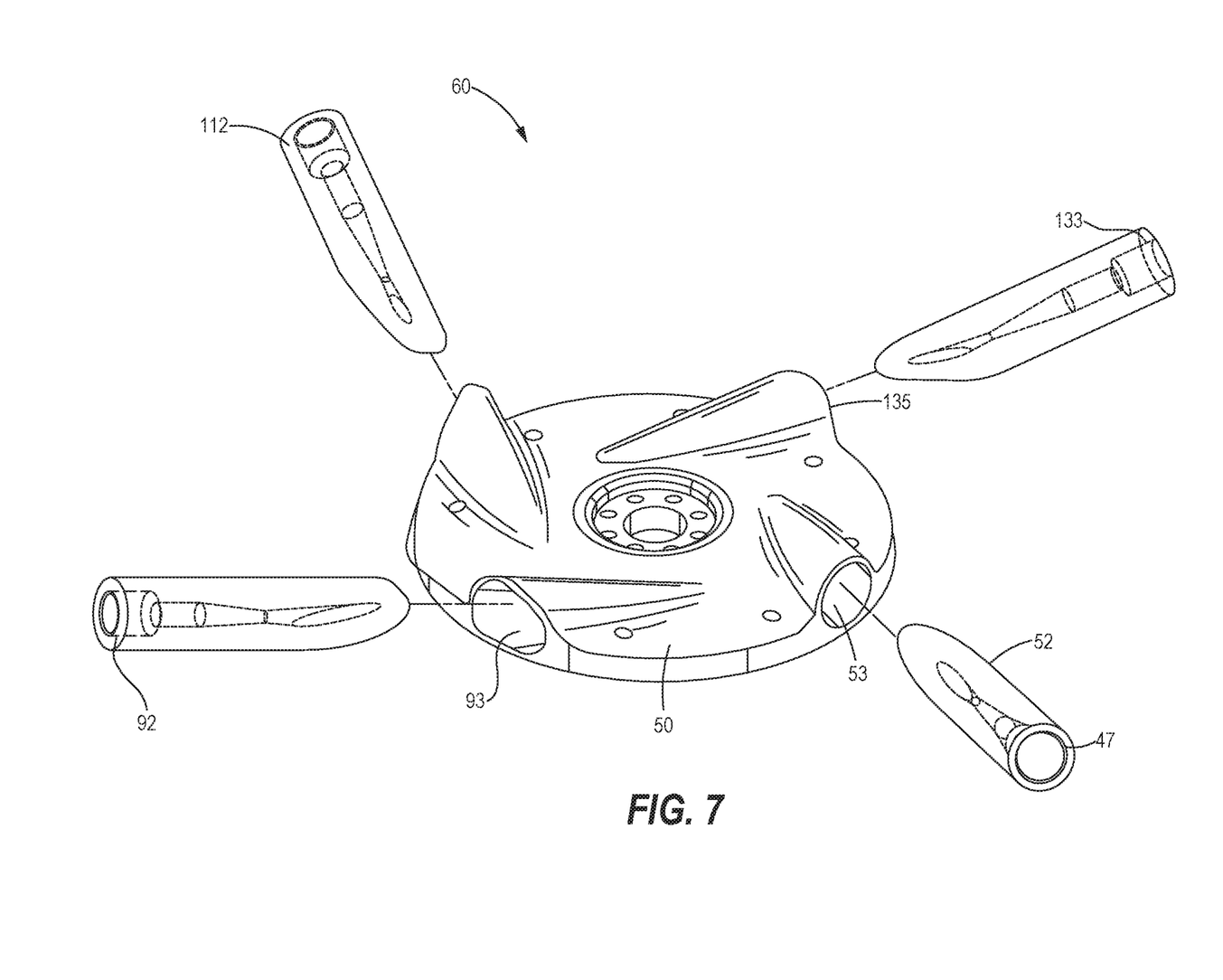
FIG. 7 is a perspective view of a turbine expander, according to one exemplary embodiment of the present disclosure.

As described above, the passive control 38 may be integral and defined by the nozzle component 26. In other embodiments, the passive control 38 may be fixed to the nozzle component 26, for example, by welding, screwing, friction, etc. As shown in FIG. 7, a removable passive control 47 may be removably coupled to a standalone nozzle housing 50. When the removable nozzle component 52 is removably coupled to the standalone nozzle housing 50, the standalone nozzle housing 50 may define a bore 53 for selectively receiving a removable nozzle component 52 coupled to the removable passive control 47. In this manner, the removable nozzle component 52 may be selectively deposed in the bore 53. Advantageously, when the removable nozzle component 52 is removable coupled to the standalone nozzle housing 50, manufacturing complexity of a turbine expander 60 may be reduced. Specifically, the removable nozzle component 52 and the standalone nozzle housing 50 may be machined and/or cast independently, thereby reducing manufacturing time and manufacturing costs.

Figure 8:
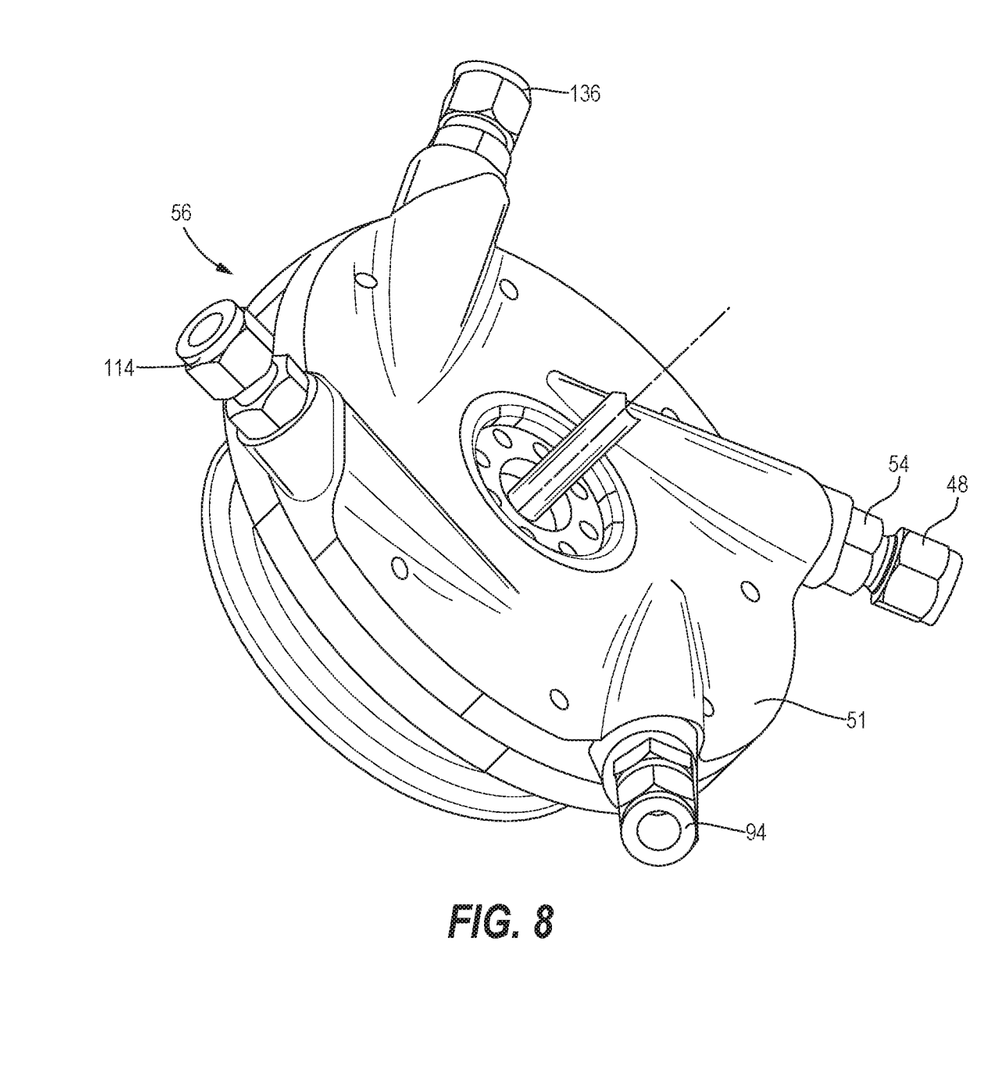
FIG. 8 is a perspective view of a turbine expander, according to one exemplary embodiment of the present disclosure.

When the threaded passive control 48 is removably coupled to the threaded nozzle housing 51, a threaded nozzle component 54 of the threaded nozzle housing 51 may also include screw threads (not shown). The threaded passive control 48 may also include screw threads (not shown) so that the threaded passive control 48 may be removably coupled to the threaded nozzle component 54 of a turbine expander 56. In other embodiments, the threaded passive control 48 may be removably coupled to the standalone nozzle housing 51 by a transition or interference fit.

The passive control 38 may further be defined as a first passive control 62, and the nozzle component 26 may further be defined as a first nozzle component 64. Moreover, each section of the nozzle component 26 may further defined as a first section (e.g. a first nozzle, a first throat section, etc.).

With reference to FIG. 5, the nozzle assembly 20 may also include a second passive control 68 coupled to a second nozzle component 70 for directing the working fluid. As shown, when present, the second nozzle component 70 defines a second nozzle 72. The second passive control 68 may have a second channel 74, second seal 75, a second biasing member 76, and a second passive control inlet 77.

The second nozzle 72 has a second geometrical configuration. The second geometrical configuration may be a converging-type configuration, a diverging-type configuration, or a de Laval configuration. Typically, the second geometrical configuration is a de Laval configuration as shown in FIG. 5. When the second geometrical configuration is a de Laval configuration, the second nozzle 72 may have a second working fluid inlet 78, a second converging section 79, a second diverging section 80, a second throat section 82 separating the second converging section 79 from the second diverging section 80, and a second working fluid outlet 83.

In one embodiment, the second geometrical configuration of the second nozzle 72, when present, is different from the first geometrical configuration of the first nozzle 65. In some embodiments, the first and second geometrical configurations may be different types of configurations. For example, the first geometrical configuration may be a converging-type configuration and the second geometrical configuration may be a de Laval configuration. In other embodiments, as shown in FIG. 5, the first and second geometrical configuration may be the same type of configuration buy have corresponding sections that differ from each other. For example, when the first and second geometrical configurations are de Laval configurations, at least one of a first working fluid inlet 84, first converging section 85, first throat section 66, and first diverging section 86, and the first working fluid outlet 87 is different from the corresponding second working fluid inlet 78, second converging section 79, second throat section 66, second diverging section 80, and second working fluid outlet 83 of the second nozzle 72.

In some embodiments, when the first and second geometrical configurations are de Laval configurations, a second throat cross-sectional area 88 is different from a first throat cross-sectional area 89, as shown in FIG. 6. As described above, whether the velocity of the working fluid is choked at the first and second throat sections 66, 82 is determined by the first and second throat cross-sectional areas 89, 88 and the working fluid pressure and mass flow rate. In one embodiment, the nozzles are designed optimized for different flow rates, and the first and second throat cross-sectional areas 89, 88 are different. In this embodiment the working fluid pressure and mass flow rate may be suitable for one of the first and second nozzles 65, 72 to accelerate the working fluid and not the other of the first and second nozzles 65, 72. In another embodiment, the nozzles don't necessarily need to be different since the flow rate of the working fluid will be additive. In this exemplary embodiment, the first nozzle 65 will always be open when the second nozzle 72 opens.

Further, in some embodiments when a first and second passive control 62, 68 are both present, the amount of force required to move a first seal 90 of the first passive control 62 from the closed to open position, as described above, may different from the force required to move the second seal 75 of the second passive control 68 from the closed to open position. Because these forces are different, the working fluid pressure and mass flow rate may be suitable to move the first seal 90, or the second seal 75, from the closed to open position to the open position but not the other of the first and second seal 90, 75. During operation of the ICE, heat recovered by the waste heat recovery system 1 may change the required working fluid pressure and mass flow rate such that either one, both, or none of the first and second seals 90, 75 move from the closed position to the open position. When the first and second seal 90, 75 are moved to the open position, they direct the working fluid to flow to the first and second nozzles 65, 72, respectively, and expand the range of working fluid mass flow rates that the waste heat recovery stem 1 may be operated at for a specific working fluid pressure. This advantageously allows the waste heat recovery stem 1 to retain maximum cycle efficiency and power output for a broader range of ICE operating states, as described in further detail below.

As shown in FIG. 2 and described above, the second passive control 68 may be integral with the nozzle housing 21. In other embodiments, the second passive control 68 may be fixed to the nozzle housing 21, for example, by welding, screwing, friction, etc. As shown in FIGS. 7 and 8, in still other embodiments, a second removable passive control 92 may be removably coupled to the standalone nozzle housing 50. When the second removable passive control 92 is removably coupled to the standalone nozzle housing 50, the standalone nozzle housing 50 may define a second bore 93 for selectively receiving the second removable nozzle component 92. In this manner, the second removable passive control 92 may be selectively disposed in the second bore 93.

When a second threaded passive control 94 is removably coupled to the threaded nozzle housing 51, the second threaded passive control 94 may also include screw threads so that the second threaded passive control 94 may be removably coupled to the threaded nozzle housing 51. In other embodiments, the second threaded passive control 94 may be removably coupled to the threaded nozzle housing 51 by a transition or interference fit.

With reference to again to FIG. 5, the nozzle assembly 20 may also include a third passive control 95 coupled to a third nozzle component 97 for directing the working fluid. As shown, when present, the third nozzle component 97 defines a third nozzle 98. The third passive control 95 may have a third channel 99, a third seal 100, a third biasing member 101, and a third passive control inlet 102.

The third nozzle 98 has a third geometrical configuration. The third geometrical configuration may be a converging-type configuration, a diverging-type configuration, or a de Laval configuration. Typically, the third geometrical configuration is a de Laval configuration as shown in FIG. 5. When the third geometrical configuration is a de Laval configuration, the third nozzle 98 may have a third working fluid inlet 104, a third converging section 106, a third diverging section 107, a throat section 108 separating the third converging section 106 from the third diverging section 107, and a third working fluid outlet 110.

In one embodiment, the third geometrical configuration of the third nozzle 98, when present, is different from the first and second geometrical configuration of the first and second nozzles 65, 72. In some embodiments, the first, second, and third geometrical configurations may be different types of configurations. For example, the first or second geometrical configuration may be a converging-type configuration and the third geometrical configuration may be a de Laval configuration. In other embodiments, as shown in FIG. 5, the first, second, and third geometrical configuration may be the same type of configuration buy have corresponding sections that differ from each other. For example, when the first, second, and third geometrical configurations are de Laval configurations, at least one of the first and second working fluid inlet 84, 78, first and second converging sections 85, 79, the first and second throat sections 66, 82, the first and second diverging sections 86, 80, and the first and second working fluid outlets 87, 83 is different from the corresponding third working fluid inlet 104, third converging section 106, third throat section 108, third diverging section 107, and third working fluid outlet 110 of the third nozzle 98.

In some embodiments, when the first, second, and third geometrical configurations are de Laval configurations, a third throat cross-sectional area 111 is different from the first and second throat cross-sectional area 89, 88. As described above, whether the velocity of the working fluid is chocked at the first, second, or third throat sections 66, 82, 108 is determined by the first, second, and third throat cross-sectional areas 89, 88, 111 and the working fluid pressure and mass flow rate. Because the first, second, and third throat cross-sectional areas 89, 88, 111 are different, the working fluid pressure and mass flow rate may be suitable for one of the first, second, or third nozzles 65, 72, 98 to accelerate the working fluid and not the other of the first, second, and third nozzles 65, 72, 98.

Further, in some embodiments when a first, second, and third passive control 62, 68, 98 are present, the amount of force required to move a first seal 90 of the first passive control 62 from the closed to open position, as described above, may different from the force required to move the second seal 75 of the second passive control 68 from the closed to open position, or the third seal 100 from the closed to open position. Because these forces are different, the working fluid pressure may be suitable to move the first seal 90, the second seal 75, or the third seal 95 from the closed to open position but not the other of the first, second, or third seal 90, 75, 95. During operation of the ICE, heat recovered by the waste heat recovery system 1 may change the working fluid pressure such that either one, two, three, or none of the first, second, and third seal 90, 75, 95 move from the closed position to the open position. When the first, second, and third seal 90, 75,95 are moved to the open position, they direct the working fluid to flow to the first, second, and third nozzles 65, 72, 98 respectively, and expand the range of working fluid mass flow rates that the waste heat recovery system 1 may be operated at for a specific working fluid pressure. This advantageously allows the waste heat recovery system 1 to retain maximum cycle efficiency and power output for a broader range of ICE operating states, as described in further detail below.

As shown in FIG. 2 and described above, the third passive control 95 may be integral with the nozzle housing 21. In other embodiments, the third passive control 95 may be fixed to the nozzle housing 21, for example, by welding, screwing, friction, etc. As shown in FIGS. 7 and 8, in still other embodiments, a third removable passive control 112 may be removably coupled to the standalone nozzle housing 50. When the third removable passive control 112 is removably coupled to the standalone nozzle housing 50, the standalone nozzle housing 50 may define a third bore 113 for selectively receiving the third removable passive control 112. In this manner, the third removable passive control 112 may be selectively disposed in the third bore 113.

When a third threaded passive control 114 is removably coupled to the threaded nozzle housing 51, the third threaded passive control 114 may also include screw threads so that the third threaded passive control 114 may be removably coupled to the threaded nozzle housing 51. In other embodiments, the third threaded passive control 114 may be removably coupled to the threaded nozzle housing 51 by a transition or interference fit.

With reference to again to FIG. 5, the nozzle assembly 20 may also include a fourth passive control 95 coupled to a fourth nozzle component 116 for directing the working fluid. As shown, when present, the fourth nozzle component 116 defines a fourth nozzle 118. The fourth passive control 115 may have a fourth channel 119, a fourth seal 120, a fourth biasing member 121, and a fourth passive control inlet 122.

The fourth nozzle 118 has a fourth geometrical configuration. The fourth geometrical configuration may be a converging-type configuration, a diverging-type configuration, or a de Laval configuration. Typically, the fourth geometrical configuration is a de Laval configuration as shown in FIG. 5. When the fourth geometrical configuration is a de Laval configuration, the fourth nozzle 118 may have a fourth working fluid inlet 124, a fourth converging section 126, a fourth diverging section 127, a fourth throat section 128 separating the third converging section 126 from the third diverging section 127, and a fourth working fluid outlet 130.

In one embodiment, the fourth geometrical configuration of the fourth nozzle 118, when present, is different from the first, second, and third geometrical configuration of the first, second, and third nozzles 65, 72, 98. In some embodiments, the first, second, third, and fourth geometrical configurations may be different types of configurations. For example, the first, second, or third geometrical configuration may be a converging-type configuration and the fourth geometrical configuration may be a de Laval configuration. In other embodiments, as shown in FIG. 5, the first, second, third, and fourth geometrical configuration may be the same type of configuration buy have corresponding sections that differ from each other. For example, when the first, second, third, and fourth geometrical configurations are de Laval configurations, at least one of the first, second, and third working fluid inlets 84, 78, 104, the first, second, and third converging sections 85, 79, 106, the first, second, and third throat sections 66, 82, 108, the first, second, and third diverging sections 86, 80, 107, and the first, second, and third working fluid outlets 87, 83, 110 is different from the corresponding fourth working fluid inlet 124, fourth converging section 126, fourth throat section 128, fourth diverging section 127, and fourth working fluid outlet 130 of the third nozzle 118.

In some embodiments, when the first, second, third, and fourth geometrical configurations are de Laval configurations, a fourth throat cross-sectional area 131 is different from the first, second, and third throat cross-sectional areas 89, 88, 111. As described above, whether the velocity of the working fluid is choked at the first, second, third, or fourth throat sections 66, 82, 108, 128 is determined by the first, second, third, and fourth throat cross-sectional areas 89, 88, 111, 131 and the working fluid pressure. Because the first, second, third, and fourth throat cross-sectional areas 89, 88, 111, 131 are different, the working fluid pressure may be suitable for one of the first, second, third, or fourth nozzles 65, 72, 98, 118 to accelerate the working fluid and not the other of the first, second, third, or fourth nozzles 65, 72, 98, 118.

Further, in some embodiments when a first, second, third, or fourth passive controls 62, 68, 98, 115 are present, the amount of force required to move a first seal 90 of the first passive control 62 from the closed to open position, as described above, may different from the force required to move the second seal 75 of the second passive control 68 from the closed to open position, the third seal 100 of the third passive control 98 from the closed to open position, or the fourth seal 120 of the fourth passive control 115 from the closed to open position. Because these forces are different, the working fluid pressure may be suitable to move the first seal 90, the second seal 75, the third seal 95, or the fourth seal 120 from the closed to open position but not the other of the first, second, third, or fourth seals 90, 75, 95, 115. During operation of the ICE, heat recovered by the waste heat recovery system 1 may change the working fluid pressure and mass flow rate such that either one, two, three, all four, or none of the first, second, third, or fourth seals 90, 75, 95, 120 move from the closed position to the open position. When the first, second, third, or fourth seals 90, 75, 95, 120 are moved to the open position, they direct the working fluid to flow to the first, second, third, or fourth nozzles 65, 72, 98, 118 respectively, and expand the range of working fluid mass flow rates that the waste heat recovery stem 1 may be operated at for a specific working fluid pressure. This advantageously allows the waste heat recovery system 1 to retain maximum cycle efficiency and power output for a broader range of ICE operating states, as described in further detail below.

As shown in FIG. 2 and described above, the fourth passive control 115 may be integral with the nozzle housing 21. In other embodiments, the fourth passive control 115 may be fixed to the nozzle housing 21. As shown in FIGS. 7 and 8, in still other embodiments, a fourth removable passive control 133 may be removably coupled to the standalone nozzle housing 50. When the third removable passive control 133 is removably coupled to the standalone nozzle housing 50, the standalone nozzle housing 50 may define a fourth bore 135 for selectively receiving the fourth removable passive control 133. In this manner, the fourth removable passive control 133 may be selectively disposed in the fourth bore 135.

When a fourth threaded passive control 136 is removably coupled to the threaded nozzle housing 51, the fourth threaded passive control 136 may also include screw threads so that the fourth threaded passive control 136 may be removably coupled to the threaded nozzle housing 51. In other embodiments, the fourth threaded passive control 136 may be removably coupled to the threaded nozzle housing 51 by a transition or interference fit.

It is to be appreciated that the nozzle assembly 20 may further include any number of additional nozzle components and that the description regarding the nozzle component 26 or passive control 38 is applicable to any additional nozzle component or passive control. It is to be further to be appreciated that any geometrical configuration of any nozzle defined by the additional nozzle components will be different from at least one of the nozzles included in the nozzle assembly. In this manner, the operating range of the waste heat recovery system 1 can be expanded even further by the inclusion of additional nozzle components coupled to additional passive controls beyond the first, second, third, and fourth nozzle components 64, 70, 97, 116 described herein. For example, the nozzle assembly 20 may include five, six, seven, eight, or less than four nozzle components.

With reference again to FIG. 1, the waste heat recovery system 1 includes the passive control 38 in fluid communication with the turbine expander 2 for directing the working fluid to the turbine expander 2. In one embodiment, the passive control includes at least one of the first, second, third, and/or fourth passive controls 62, 68, 95, 115 included in the turbine expander 2. In another embodiment, the first, second, third, and/or fourth passive controls 62, 68, 95, 115 are in fluid communication with the evaporator 8. In a further embodiment, the pressure of the working fluid may not be great enough to force the first, second, third, or fourth seals 90, 75, 95, 115 from the closed to the open position, in which case the working fluid is directed to bypass the turbine expander 2 through working fluid bypass 152. Bypassing the turbine expander may be beneficial when the quality of the working fluid is of a low level that it may damage the turbine expander, such as during the startup of a vehicle.

As shown in FIG. 1, the waste heat recovery system 1 may also include an evaporator 8 in fluid communication with the flow control device 14 and the turbine expander 2. The evaporator 8 transfers heat rejected by the ICE to the working fluid, thereby causing the working fluid to phase change from the liquid state to the vapor state. When present, the evaporator 8 is disposed upstream of the passive controls.

The waste heat recovery system 1 may also include a condenser 4 in fluid communication with the turbine expander 22 and the passive controls. The condenser 4 condenses the working fluid from the vapor state to the liquid state after the working fluid passes through the turbine expander 2. The condenser 4 is disposed downstream of the turbine expander 2. In some embodiments, when the waste heat recovery system 1 includes the evaporator 8, the condenser 4 is disposed downstream of the turbine expander 2 and upstream the evaporator 8.

To ensure maximum cycle efficiency and power output of the waste heat recovery system 1, the combination of the first, second, third, and fourth nozzles 65, 72, 98, 118 that the working fluid passes through prior to rotating the turbine blade 16 is based on a function of the working fluid pressure.

As described above, heat rejected by the ICE is transferred by the waste heat recovery system 1 to the working fluid so that the working fluid undergoes a liquid-vapor phase change. Heat rejected by the ICE varies based on the speed and load (i.e., operating state) of the ICE. As such, at certain operating states of the ICE (e.g. start-up, acceleration, etc.), heat rejected by the ICE and recovered by the waste heat recovery system 1 may render the working fluid pressure unsuitable for one or more of the first, second, third, and fourth nozzles 65, 72, 98, 118 if maximum cycle efficiency and power output of the waste heat waste heat recovery system 1 is to be maintained.

The first, second, third, and/or fourth passive controls 62, 68, 95, 115, or control devices, are each adapted to control the flow and direct, or regulate, the working fluid to their corresponding first, second, third, and/or fourth nozzle components 64, 70, 97, 116 that they are coupled to, or to bypass the turbine expander 2, based on the characteristic of the working fluid. Thus, each passive control is configured to move from the closed position to the open position when the working fluid comes in contact with its corresponding seal and the working fluid has a pressure great enough to exceed a predetermined threshold value. The threshold value corresponds to the force required to overcome the biasing member, and the threshold value, in one embodiment, further corresponds to the pressure or flow rate suitable for the respective coupled nozzle to achieve maximum efficiency without damaging the turbine blade 16. In this manner, the different geometrical configurations of the first, second, third, and/or fourth nozzles 65, 72, 98, 118 advantageously expand the operating range of the waste heat recovery system 1 by accelerating the working fluid at a broader range of working fluid pressures, mass flow rates, temperatures, etc. Moreover, as the working fluid pressure and/or mass flow rate varies during operation of the ICE, the waste heat recovery system 1 advantageously allows for an incremental increase of the working fluid flow to the turbine blade 16.

For example, during transition from low to high heat availability from the ICE, the working fluid mass flow rate may start low to ensure maximum heat transfer to the working fluid for phase change and transition to a high flow to limit evaporator outlet temperature. To maximize turbine performance, the working fluid pressure should be maintained in a narrow range of operation dictated by the design of the turbine blades. For a turbine that utilizes using choked nozzles, the ideal nozzle cross section is required to be significantly smaller at the initial low availability condition than at the higher availability condition in order to maintain the pressure in the preferred narrow range. During this exemplary transition, the proposed passive controls would initially direct the working fluid to at least one of the first, second, third, and/or fourth nozzles 65, 72, 98, 118 that has a small throat cross-sectional area. As the pressure is increased during the transition, the passive control would enable flow through at least one more of the first, second, third, and/or fourth nozzles 65, 72, 98, 118. Although system pressure increases, the pressure increment is significantly lessened due to the changing flow vs. pressure relationship as the nozzle valves 65, 72, 98, 118 progressively open due to the stepped change in total throat area.

In another example, during transition from high to low heat availability from the ICE, the working fluid mass flow rate will start high as previously described to regulate working fluid temperature. As heat availability decreases, the working fluid mass flow will be decreased by the system controller to ensure the working fluid remains in the superheated vapor state during the transition. Once again, working fluid pressure should be maintained in a narrow range of operation needed to maximize turbine performance. As the working fluid mass flow and pressure is reduced, the passive valves on the nozzles progressively close. Although system pressure is decreasing throughout the transition, the pressure decrement is lessened due to the changing flow vs. pressure relationship is the nozzle valves 65, 72, 98, 118 progressively close due to the stepped change in total throat area.

With reference again to FIG. 1, the waste heat recovery system 1 may also include a working fluid circuit 150 for circulating the working fluid. The working fluid circuit 150 fluidly couples the turbine expander 2, the passive control 38, the evaporator 8, and or the condenser 116. The working fluid circuit 120 may further include a pump 6 for circulating the working fluid through the working fluid circuit 120.

INDUSTRIAL APPLICABILITY

The described embodiment of the waste recovery system 1 can be useful in a wide variety of applications that may benefit from this disclosure. The waste heat recovery system 1 utilizes an organic Rankine cycle (ORC) for recovering waste heat from an internal combustion engine (ICE). This efficiency of energy capture, reliability of the turbine expander, and cost are improved by utilizing passive controls that individually direct the working fluid to nozzles of various sizes and ratios of throat areas.

Figure 9:
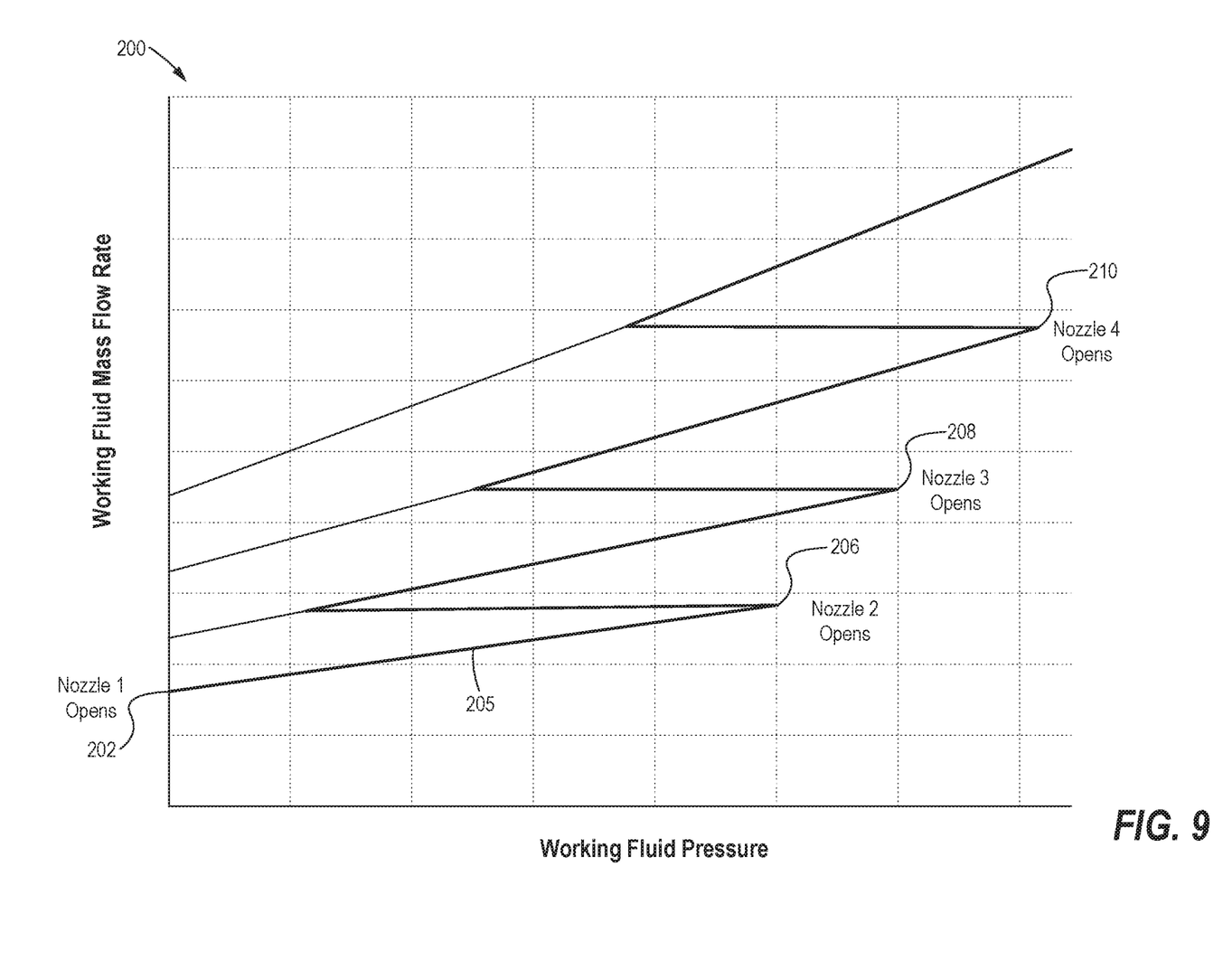
FIG. 9 is an illustration depicting the variable admission flow characteristics of a working fluid inside of a turbine expander including a passive control when the pressure of the working fluid is increasing.

With continued reference to FIGS. 1-8, a first schematic illustration 200 in FIG. 9 depicting the variable admission flow characteristics of a working fluid, specifically ethanol at 220 degrees Celsius, in an exemplary increasing pressure waste heat recovery system 1. In the FIG. 9 and FIG. 10 examples, each listed passive control seal is held in apposition by a biasing member, and the seal moves from the closed position to the open position when the working fluid comes in contact with the seal and has a pressure great enough to force the seal out of apposition. As shown above, in further examples, each passive control may have a seal that may include the components found in a valve which passively reacts to changes in working fluid temperature, working fluid pressure, or other inputs as the biasing member, and may move from the closed position to the open position due to properties of the working fluid, such as temperature, flow, or pressure.

In the first schematic 200, a first portion (not shown) of the working fluid reaches the first seal 90 of the first passive control 62. When a pressure of the first portion 201 of the working fluid is enough to overcome a threshold pressure of the first seal 90, the first passive control 62 moves to the open position at first point 202 and allows a second portion (not shown) of the working fluid to flow to first nozzle 65 and is directed to the turbine blade. A third portion 205 of the working fluid continues to flow through the working fluid circuit 150. Once the pressure of working fluid reaches threshold pressure of the second seal 75, the second passive control 68 moves from the closed to the open position and a fourth portion (not shown) of the working fluid flows to the second nozzle 72 and is directed to the turbine blade 16. Further, once the pressure in the fluid working circuit reaches a pressure threshold of the third seal 100 and a pressure threshold of the fourth seal 120, the third and fourth passive controls 95, 115, respectively, open up and a portion of the working fluid is directed through each to the turbine blade.

Figure 10:
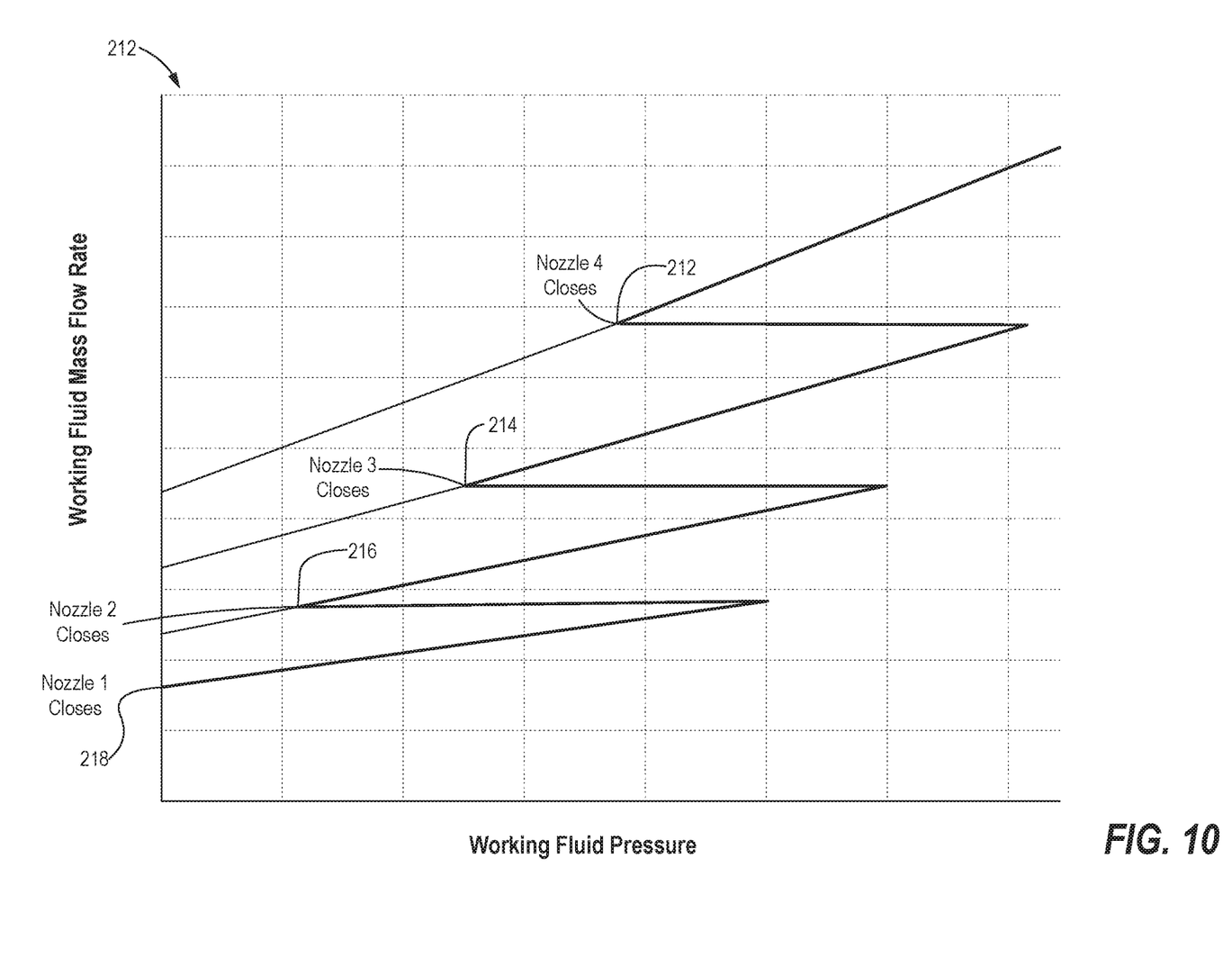
FIG. 10 is an illustration depicting the variable admission flow characteristics of a working fluid inside of a turbine expander including a passive control when the pressure of the working fluid is decreasing.

A second schematic illustration 212 in FIG. 10 depicts the variable admission flow characteristics of a working fluid, specifically ethanol at 220 degrees Celsius, in an exemplary decreasing pressure waste heat recovery system 1. In this illustration, the fourth passive control 115 moves to the closed position at the fifth point 212, the third passive control 95 moves to the closed position at the sixth point 214, the second passive control 68 moves to the closed position at the seventh point 216, and the first passive control 62 moves to the closed position at the eighth point 218 as the pressure in the working circuit 150 decreases.

Moreover, it is to be understood that the foregoing may be a description of only one embodiment of the disclosure. However, the disclosure is not limited to the particular embodiment(s) disclosed. For example, different variations on the turbine design such as radial inflow, Pelton, or reaction turbine type. Moreover, statements contained in the description that relate only to particular embodiments are not to be construed as limitations on scope of the disclosure, or on specific terms used in the claims, except where a term or phrase may have otherwise been expressly defined. Various other embodiments, changes, and modifications to the disclosed embodiment(s) will be apparent to those skilled in the art and are intended to fall within the spirit and scope of the appended claims.

As used in this disclosure, various terms "e.g.," "for example," "for instance," "such as," and "like," and verbs "comprising," "having," "including," and other verb forms, when used in conjunction with a listing of one or more components or other items, are to be construed as open-ended, meaning that the listing is not to be considered as excluding other or additional components or items. All terms are to be given their broadest reasonable meanings unless used in contexts that clearly require specific interpretations.

What is claimed is:

1. A turbine expander for outputting power extracted from a working fluid, the turbine expander comprising:
    a turbine blade rotatable by the working fluid;
    a shaft coupled to and rotatable by the turbine blade, the shaft extending along a longitudinal axis;
    a nozzle assembly for directing the working fluid to the turbine blade for rotating the turbine blade, the nozzle assembly including a nozzle housing disposed about the shaft and adjacent the turbine blade, and a nozzle component for accelerating the working fluid, the nozzle component defining a nozzle throat having a geometrical configuration; and
    a passive control coupled to the nozzle component for directing the working fluid, the passive control including a channel in fluid connection with the nozzle, wherein the channel is formed at an inlet of the nozzle assembly, and including a seal being in apposition across an interior width of the channel, and the seal is configured to move from a closed position to an open position when the working fluid comes in contact with the seal.

2. The turbine expander of claim 1, in which the geometrical configuration is a de Laval configuration having a throat cross-sectional area defined by a converging section in fluid connection with a diverging section.

3. The turbine expander of claim 1, in which the seal is held in apposition by a biasing member, and the seal moves from the closed position to the open position when the working fluid comes in contact with the seal and has a pressure great enough to force the seal out of apposition.

4. The turbine expander of claim 3, in which the biasing member is a spring.

5. The turbine expander of claim 1, in which the nozzle assembly has a first nozzle component coupled to a first passive control, and a second nozzle component coupled to a second passive control.

6. The turbine expander of claim 5, in which the first nozzle component receives a first portion of the working fluid having a first pressure and the second passive control receives a second portion of the working fluid at a second pressure, the second pressure being great enough to force a seal of the second passive control out of apposition.

7. The turbine of claim 6, in which the second pressure is greater than the first pressure.

8. The turbine expander of claim 7 further comprising a third nozzle component coupled to a third passive control, the third passive control configured to receive a third portion of the working fluid at a third pressure.

9. The turbine expander of claim of claim 1, in the nozzle component is integral with the nozzle assembly.

10. An organic Rankine cycle waste heat recovery system for recovering waste heat of an internal combustion engine, said waste heat recovery system comprising:
    an evaporator for transferring heat discarded by an internal combustion engine to a working fluid;
    a turbine expander for outputting power based on the working fluid, said turbine expander comprising:
    a turbine blade rotatable by the working fluid,
    a shaft coupled to and rotatable by the turbine blade, with the shaft extending along a longitudinal axis,
    a nozzle assembly for directing the working fluid to the turbine blade for rotating the turbine blade, the nozzle assembly including a nozzle housing disposed about the shaft and adjacent the turbine blade, and a nozzle component coupled to the nozzle housing for accelerating the working fluid, the nozzle component defining a nozzle throat having a geometrical configuration, and
    a passive control coupled to the nozzle component for directing the working fluid, the passive control including a channel in fluid connection with the nozzle, wherein the channel is formed at an inlet of the nozzle assembly, and a seal being in apposition across an interior width of the channel, and the seal configured to move from a closed position to an open position when the working fluid comes in contact with the seal;
    a condenser in fluid communication with the turbine expander to condense the working fluid from a vapor state to a liquid state; and
    a pump to circulate a working fluid from the condenser to the evaporator.

11. The system of claim 10, in which the pump increases the pressure of the working fluid.

12. The system of claim 11, in which the working fluid flows through a working fluid bypass when the seal is in a closed position and is directed to the turbine blade when in the open position.

13. The system of claim 10, in which the passive control is removable from the nozzle component.

14. A method of recovering waste heat of an internal combustion engine, comprising:
    providing a turbine expander for outputting power based on a working fluid, the turbine expander comprising:
    a turbine blade rotatable by the working fluid,
    a shaft coupled to and rotatable by said turbine blade, with said shaft extending along a longitudinal axis,
    a nozzle assembly for directing the working fluid to the turbine blade for rotating the turbine blade, the nozzle assembly including a nozzle housing disposed about the shaft and adjacent the turbine blade, and one or more nozzle components coupled to the nozzle housing for accelerating the working fluid, with each of the one or more nozzle components defining a nozzle throat having a geometrical configuration, and one or more passive controls each coupled to the one or more nozzle components for directing the working fluid to their respective coupled nozzle components, each of said one or more passive controls including a channel in fluid connection with their respective coupled nozzles, wherein the channel is formed at an inlet of the nozzle assembly, and including a seal being in apposition across an interior width of the channel, and the seal moves from a closed position to an open position when the working fluid comes in contact with said seal;

directing a first portion of the working fluid to a first passive control of the one or more passive controls; and receiving the working fluid at a first nozzle component of the one or more nozzle components.

15. The method of claim 14, further comprising a second passive control coupled to a second nozzle component, said second nozzle component coupled to the nozzle housing.

16. The method of claim 15, in which the second passive control receives a second portion of the working fluid.

17. The method of claim 16, in which the first portion of the working fluid is directed to the turbine blade through the first nozzle component and the second portion of the working fluid is directed to the turbine blade through the second nozzle component.

18. The method of claim 17, in which the amount of working fluid that can enter the first nozzle component after the seal of passive control is in the open position is dependent on the geometrical configuration.

19. The method of claim 18, in which the geometrical configuration is a de Laval configuration having a first throat cross-sectional area defined by a first bore and a second throat cross-sectional area defined by a second bore in fluid connection with the first bore.

20. The method of claim 14, in which the pressure of the working fluid is increased by a pump.

* * * * *